United States Patent [19]

Böhnlein et al.

[11] 4,020,862
[45] May 3, 1977

[54] APPARATUS FOR CONTROLLING THE VOLUME AND PRESSURE OF A PRESSURE MEDIUM IN A DIE-CASTING MACHINE

[75] Inventors: Friedrich Böhnlein; Roland Geier, both of Brescia, Italy

[73] Assignee: Idra-Pressen G.m.b.H., Stuttgart, Germany

[22] Filed: Mar. 22, 1976

[21] Appl. No.: 669,145

Related U.S. Application Data

[63] Continuation-in-part of Ser. No. 528,672, Dec. 2, 1974, abandoned.

[30] Foreign Application Priority Data

Dec. 15, 1973 Germany .......................... 2362482

[52] U.S. Cl. ............................. 137/115; 137/552.5; 137/601
[51] Int. Cl.² ......................................... F16K 11/10
[58] Field of Search ....... 137/115, 116, 601, 552.5, 137/492.5, 488, 492, 624.11; 251/33

[56] References Cited

UNITED STATES PATENTS

| | | | |
|---|---|---|---|
| 3,063,468 | 11/1962 | Defour | 137/552.5 |
| 3,156,157 | 11/1964 | Smith | 137/552.5 X |
| 3,437,098 | 4/1969 | Stirk | 137/552.5 X |

*Primary Examiner*—Alan Cohan
*Attorney, Agent, or Firm*—Ross, Ross & Flavin

[57] ABSTRACT

Apparatus for controlling the volume and pressure of a pressure medium in a die-casting machine has an inlet, to which high pressure, high volume flow fluid can be supplied, and an outlet to a point of use. For controlling volume flow, a plurality of diaphragms are arranged in parallel between the lines. Each has a volume actuating valve associated therewith. Actuation of these valves can allow a selected number of the diaphragms to be connected across the line to give a range of possible volume flow at a given pressure. For pressure control, a line leads from the inlet line to a plurality of series mounted pressure responsive valves, each associated with a pressure actuating valve, which can be actuated to selectively cause any one of a range of pressures to prevail in the line and in the outlet line. The selected pressure is also lead to a by-pass valve connected to the inlet, so that pressure greater than the selected pressure is diverted from the inlet line. Pressure is thus regulated coarsely at the inlet and finely at the outlet.

6 Claims, 5 Drawing Figures

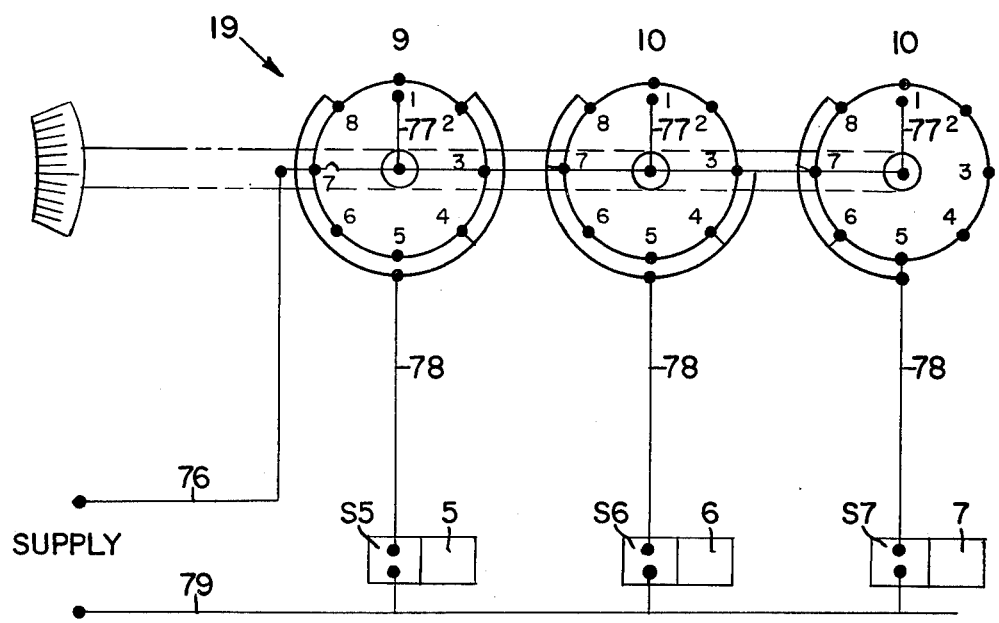
FIG. 3.
FIG. 4.
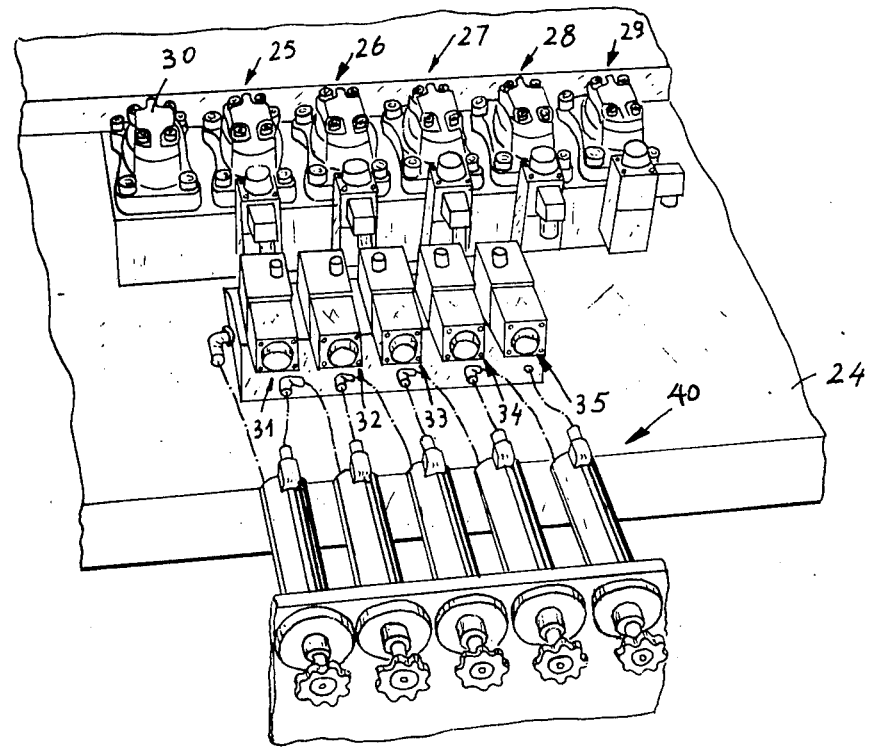

APPARATUS FOR CONTROLLING THE VOLUME AND PRESSURE OF A PRESSURE MEDIUM IN A DIE-CASTING MACHINE

This application is a continuation-in-part of Ser. No. 528,672 filed Dec. 2, 1974 now abandoned.

BRIEF DESCRIPTION OF THE DRAWINGS

FIG. 3 is a circuit showing how the actuator valves 5 6 and 7 can be activated;

FIG. 4 shows the block mounting of the apparatus; and

DESCRIPTION OF A PREFERRED EMBODIMENT

Figure 1:
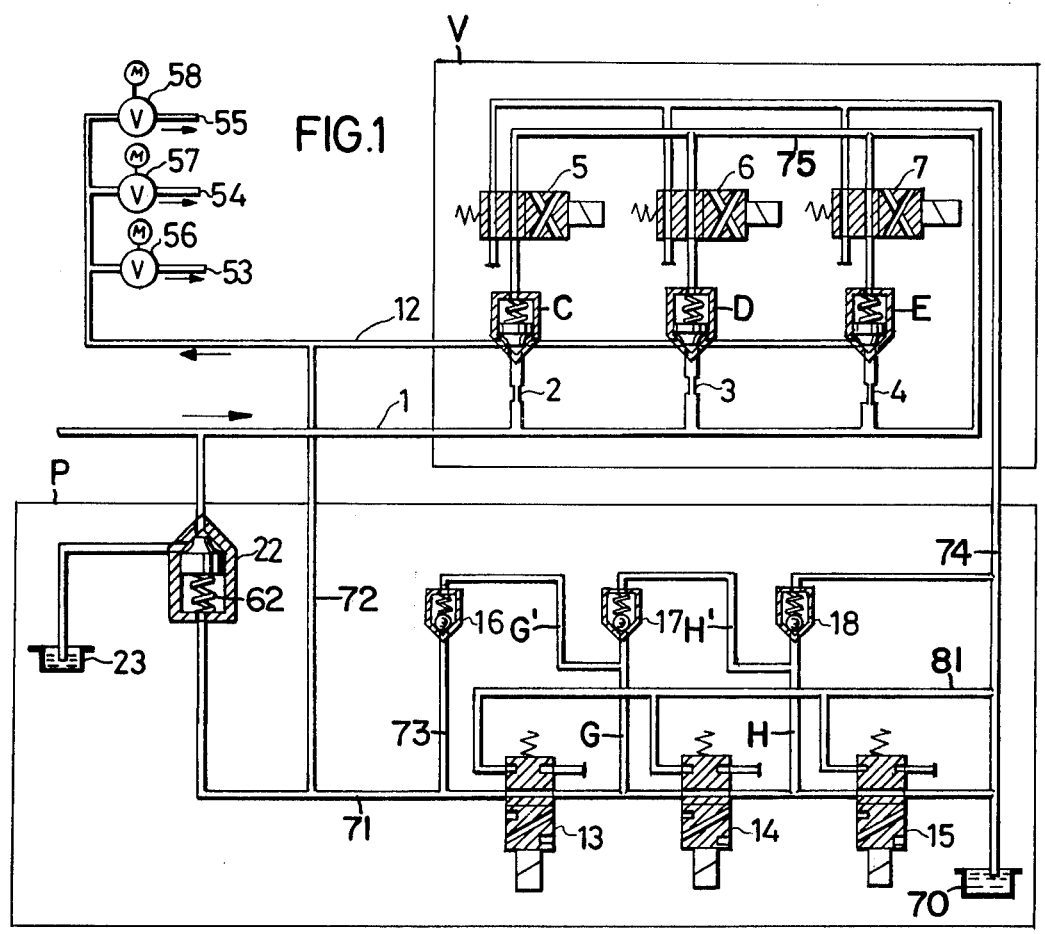
FIG. 1 is a schematic diagram of a preferred form of the invention.
Figure 2:
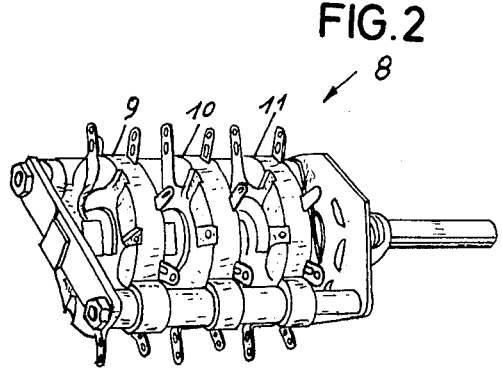
FIG. 2 is a perspective view of a switch suitable for use in the circuit of FIG. 3.

A preferred embodiment of apparatus of the invention is shown in FIG. 1 as having an inlet line 1, from a pump or similar source of high pressure fluid (not shown), and an outlet line 12 leading to a plurality of distributing outlets 53, 54, 55 to various lines on a die-casting machine. Distributing outlets 53, 54, 55 can be switched as by valves 56, 57, 58 respectively in a predetermined sequence according to the machine operating cycle, same not being of relevance to the invention so as not to be described further.

A volume flow control means V, disposed between inlet line 1 and outlet line 12, comprises three diaphragms 2, 3, 4 arranged in parallel, each with a respective lightly-loaded valve C, D, E associated therewith.

Each diaphragm has a fixed cross-sectional flow area operative to restrict volume flow therethrough at a particular pressure.

The areas of the diaphragms are preferably stepped for reasons to become apparent later. The area of diaphragm 2 can be, say, A, that of diaphragm 3, 2A, and that of diaphragm 4, 4A. The low pressure side of each of the valves C, D, E is connected to a respective volume actuating valve 5, 6 or 7, same being shown in the drawing as standard straightthrough or cross-over type valves, although they need not take this form necessarily. Their sole purpose is to enable high pressure fluid, from inlet line 1, to flow via a line 75 to associated valve C, D, E or to correct its low pressure side to a zero pressure in a line 74.

In the illustrated condition, no flow is taking place.

The control means is operative as follows. When a volume flow equivalent to area A is required, valve 5 is actuated and the high pressure fluid behind the valve member of valve C is connected to line 74, i.e. zero pressure, wherefor the pressure on the valve member of the fluid from diaphragm 2 is easily sufficient to move the valve member up (as shown,) and to allow a flow via diaphragm 2 to outlet line 12.

Selected ones of the valves C, D and E are activated to obtain a desired volume flow rates according to the following table:

| Area equivalent flow rate desired | Valves activated |
|---|---|
| 0 | None |
| A | C |
| 2A | D |
| 3A | C & D |
| 4A | E |
| 5A | C & E |
| 6A | D & E |
| 7A | C, D & Et |

Thus it will be observed that eight flow rates, including zero, can be selected by activating a selected number of valves C, D and E.

The pressure of the medium in outlet line 12 is controlled by a pressure control means P. A line 72 leads from outlet line 12 to a plurality of series-connected spring loaded valves or pressure balances 16, 17 and 18.

Each has a respective pressure actuating valve 13, 14, 15 connected in parallel therewith. As shown, each pressure actuating valve is shown as a standard valve. It's only function is either to cause a flow through its respective associated spring loaded valve 16, 17 or 18 or to prevent that flow by allowing a flow along a line 71 to a tank 70 (at zero pressure). The left hand end of line 71 leads to the low pressure side of a valve 22 which has a very weak spring 62 and which, when open, allows fluid to flow from inlet line 1 to a tank 23.

Valve 22 is the main pressure regulating component.

Assume that the inlet pressure is 50 bar (1 bar≈1 atmosphere), and that pressure in line 71, and thus on valve 22, rises to 5 bar. Valve 22 will be open, with a pressure drop of 45 bar across it. Pressure in inlet line 1 will be at or slightly above 5 bar, any pressure over this being shunted to tank 23 by valve 22. The pressure in line 71 below valve 22 is determined by valves 16, 17 and 18.

Assume that a pressure of 5 bar is required in line 12. Valve 15 is activated and blocks line 71. Fluid flowing down line 72 passes through valves 13 and 14, up a line H to valve 18 (and incidentally it also fills a line H', which has no practical effect). Valve 18 is set to open at 5 bar. Thus when the pressure in line H has risen to 5 bar, valve 18 opens. At this stage, line H (and line H') line 71 to the left of valve 15, line 72 and thus line 12, all maintain a pressure of 5 bar. However, if high supply pressure were supplied to inlet line 1, the escape route for excess pressure via pressure control means P would be too small and thus the 5 bar pressure in line 71 is also taken to valve 22, which acts to divert substantially all pressure from the source, coming in the direction of arrow 69, over 5 bar away to tank 23 and only slight overpressure passes to line 12. This slight overpressure can be easily dissipated via pressure control means P and a stable 5 bar pressure is maintained in outlet line 12. Naturally, in use, valve 18 will continually open and close to keep the pressure at 5 bar.

If pressure of 10 bar or 20 bar is required, either valve 14 or valve 13 is actuated and the same process occurs, but at the higher pressure. If a pressure of 25 bar is required, valves 16 and 18 are both actuated by activating valves 13 and 15. In this case, pressure in line 73 builds up until a pressure of 20 bar is reached. Then valve 16 opens and flow occurs via lines G', G, valve 14, and line H to valve 18. Pressure in these lines builds up to 5 bar at which it stabilizes, as previously described. Valve 16 is such that it only opens when there is a pressure drop of 20 bar across it. Thus, with the 5 bar back pressure existing in line 91, pressure in line 73 rises to 25 bar, at which pressure valve 16 opens and pressure in line 73 stabilizes. Similarly valve 22 has the 25 bar pressure on its lower side and only shunts away supplied fluid at pressures over 25 bar. Thus a pressure of 25 bar prevails and is maintained in outlet line 12.

Pressure required in outlet line 12 can be set by actuating valves 13, 14 and 15, according to the following table:

| Pressure required | Valves activated |
|---|---|
| 0 | None |
| 5 bar | 15 |
| 10 bar | 14 |
| 15 bar | 14 & 15 |
| 20 bar | 13 |
| 25 bar | 13 & 15 |
| 30 bar | 13 & 14 |
| 35 bar | 13, 14 & 15 |

Pressure actuating valves 13, 14, 15, and Volume actuating valves 5, 6 and 7 are preferably solenoid valves and each set can be activated via an 8-pole triple layer switch 19 as shown in FIG. 3. Such a switch for valves 5, 6 and 7 only is shown, the other being of comparable construction.

Switch 19 has three planes 9, 10 and 11, each having eight positions. Power is supplied from the source by a line 76 to the wipers 77 of each of the planes 9, 10 and 11. Plane 9 is associated with solenoid S5 of valve 5, plane 10 with solenoid S6, and plane 11 with solenoid S7.

For the desired volume flows V1-Vi (Vl = ) areas 0 to 7A are required. The valve settings for this are as follows (X = actuated), (- = not actuated).

| Volume flow | Area | Switch Position | Valve 5 | Valve 6 | Valve 7 |
|---|---|---|---|---|---|
| 0 | 0 | 1 | — | — | — |
| 1 | A | 2 | X | — | — |
| 2 | 2A | 3 | — | X | — |
| 3 | 3A | 4 | X | X | — |
| 4 | 4A | 5 | — | — | X |
| 5 | 5A | 6 | X | — | X |
| 6 | 6A | 7 | — | X | X |
| 7 | 7A | 8 | X | X | X |

Thus valve 5 must have current supplied to it at positions 2, 4, 6 and 8. Thus on layer 9, positions 2, 4, 6 and 8 are wired together and are connected via a line 78 to solenoid S5. Similarly layer 10 (valve 6) has positions 3, 4, 7 and 8 wired together and to solenoid S6. Similarly layer 11 (valve 6) has positions 5, 6, 7 and 8 wired together and to solenoid S7. The remaining switch positions are blank.

Thus, by turning switch 19, a volume flow can be selected at will. The corresponding situation exists with regard to pressure.

Figure 5:
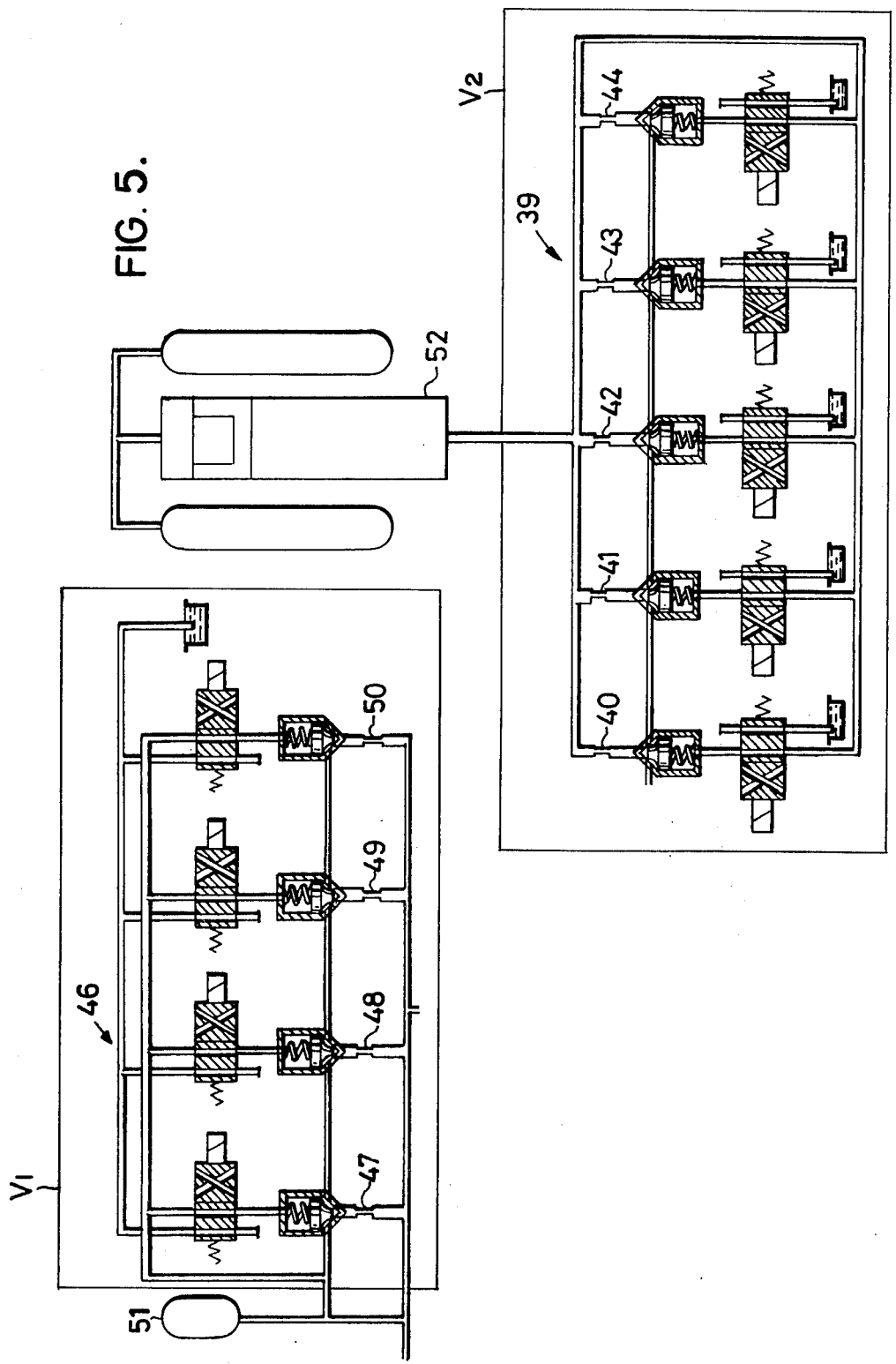
FIG. 5 shows alternative forms for parts of the apparatus.

Shown in FIG. 5 are alternative constructions of volume control means V1 and V2, wherein respectively 4 and 5 diaphragms and associated valves are provided. A pressure supply 12 can be an accumulator arrangement. FIG. 4 illustrates how a hydraulic block 30 is used for applying the compressing pressure to a press piston of a die-casting machine, not shown. The hydraulic block 39 comprises the structural groups 25, 26, 27, 28 and 29 in accordance with FIG. 5 and affords the possibility of realising 32 different flow combinations. Control of the diaphragms is effected by means of electric step switches 40 which have, in this case, five planes.

We claim:

1. Apparatus for controlling the volume and pressure of a flow of hydraulic fluid from a supply to a drive of a die-casting machine comprising:
   an inlet line,
   an outlet line,
   volume flow limiting means between the inlet and outlet lines,
   pressure control means connected to the outlet line,
   the volume flow limiting means including a plurality of diaphragms of fixed area arranged in parallelism,
   a respective one-way valve and a respective actuating valve backing each diaphragm of the volume flow limiting means,
   the actuating valves being selectively operable for opening any selected number of one-way valves under the pressure of fluid in the inlet line and for allowing flow through a corresponding selected number of diaphragms,
   a cascaded plurality of spring-loaded valves each opening at a specific pressure,
   the pressure control means including a connecting line between the outlet line and the first of the spring-loaded valves,
   a pressure actuating valve in parallel with each of the springloaded valves,
   with selective operation of the pressure actuating valves being effective to cause a selected number of the spring-loaded valves to be series connected for causing the prevail of any one of a range of pressures in the connecting line and in the outlet line,
   and a pressure-biased relief valve having its biasing pressure taken from the connecting line and being responsive to the pressure in the inlet line for relieving that pressure upon rising above the biasing pressure.

2. Apparatus as set forth in claim 1, wherein the sizes of the diaphragms are different, each succeeding diaphragm being double the area of the preceding one.

3. Apparatus as set forth in claim 1, wherein the operating pressures of the spring-loaded valves are different.

4. Apparatus as set forth in claim 1, wherein the actuator valves are connected between a line connected to the inlet line and the one-way valves.

5. Apparatus as set forth in claim 1, wherein each actuator valve is a solenoid-operated valve.

6. Apparatus as set forth in claim 5, wherein each set of actuator valves is operable by a rotary multi-pole multiple position switch having one planar switching element for each actuator valve in the set.

* * * * *